United States Patent [19]

Grosheim et al.

[11] Patent Number: 4,472,474

[45] Date of Patent: Sep. 18, 1984

[54] ELECTRICALLY CONDUCTIVE LAMINATE

[75] Inventors: Gene E. Grosheim, Hamilton; Alwyn F. Wiebe, Fairfield, both of Ohio

[73] Assignee: Formica Corp., Cincinnati, Ohio

[21] Appl. No.: 545,570

[22] Filed: Oct. 26, 1983

[51] Int. Cl.³ .............................................. B32B 21/04
[52] U.S. Cl. .................................... 428/195; 156/222; 428/206; 428/211; 428/284; 428/286; 428/408; 428/530; 428/531; 428/537
[58] Field of Search ............... 428/67, 537, 927, 922, 428/913.3, 542.6, 74, 330, 408, 242, 244, 689, 696, 530, 249, 175, 263, 196, 264, 209, 275, 211, 251, 285, 195, 284, 286, 531; 156/222; 264/137

[56] References Cited

U.S. PATENT DOCUMENTS

| | | | |
|---|---|---|---|
| 3,567,689 | 3/1971 | Economy et al. | 260/67.6 |
| 3,700,537 | 12/1970 | Scher | 428/172 |
| 3,761,448 | 9/1973 | Anderson et al. | 260/53 R |
| 3,798,111 | 3/1974 | Lane et al. | 428/537 |
| 3,811,935 | 5/1974 | Gould | 428/537 |
| 3,845,353 | 10/1974 | Shirai et al. | 428/67 |
| 4,043,970 | 8/1977 | Dahms | 260/29.3 |
| 4,120,847 | 10/1978 | Culbertson | 528/140 |
| 4,122,054 | 10/1978 | Culbertson | 260/29.3 |
| 4,122,235 | 10/1978 | Dahms | 428/436 |
| 4,154,882 | 5/1979 | Ungar et al. | 156/222 |
| 4,157,324 | 6/1979 | Culbertson | 260/32.8 |
| 4,219,602 | 8/1980 | Conklin | 428/408 |
| 4,301,040 | 11/1981 | Berbeco | 252/500 |
| 4,311,748 | 1/1982 | Casey et al. | 428/211 |
| 4,311,757 | 1/1982 | Raghava | 428/211 |
| 4,343,850 | 8/1982 | Krarig et al. | 428/537 |
| 4,374,886 | 2/1983 | Raghava | 428/211 |
| 4,376,812 | 3/1983 | West | 428/211 |

Primary Examiner—George F. Lesmes
Assistant Examiner—William M. Atkinson
Attorney, Agent, or Firm—Frank M. Van Riet

[57] ABSTRACT

An electrically conductive laminate which provides a non-instantaneous controlled rate of static dissipation is disclosed, said laminate containing, in at least the overlay or decor layer thereof, a water-soluble, alkali metal salt.

9 Claims, No Drawings

ELECTRICALLY CONDUCTIVE LAMINATE

BACKGROUND OF THE INVENTION

For many years laminates have been used as a surfacing material in residential and commercial structures. Typical applications of said laminates are surfacing for walls, partitions, table tops, counter tops, furniture, doors and the like. Such laminates generally are produced from a plurality of resin impregnated core sheets usually composed of kraft paper which has been impregnated with a thermosetting resin and, more particularly, with a thermosetting water-soluble or water-insoluble phenolic resin. When the kraft paper has been impregnated with the thermosetting resin, the sheets are dried and cut to the appropriate size. Thereupon, a plurality of these resin impregnated sheets are stacked in a superimposed relationship. The number of plies or sheets in the stack depends on the ultimate intended use of the laminate. For most purposes, the number of plies of these core sheets will total about three to nine but can total as many as 15–20.

There is then placed on the stack of core sheets a decorative sheet which is generally a sheet of paper bearing a printed design or of a solid color and impregnated with a noble thermosetting resin which is not subject to significant darkening upon the application of heat. Suitable resins for the decorative sheets are the aminotriazine resins and more particularly the melamine-formaldehyde resins, the benzoguanamine-formaldehyde resins and the unsaturated polyester resins and the like. It is generally desirable when making decorative laminates to make use of a protective overlay sheet which is placed atop and is similar to the decorative sheet but is generally devoid of design and in the final laminate is transparent. The stack of impregnated sheets is inserted into a laminating press and is heat and pressure consolidated to a unitary structure. During the consolidation step, the thermosetting resins are converted to the thermoset state thereby providing an extremely hard, attractive and permanent surfacing material. For obvious economic reasons, it is common practice to consolidate a plurality of these individual laminating assemblies into one large assembly, or press pack, said stacks being separated from one another by a release sheet, and then to laminate this pack by heat and pressure application.

The press pack is then pressed or molded. This is accomplished by placing the pack between the platens of a hydraulic press. The press usually has multiple openings so that many packs may be pressed at once. Such an approach produces a very smooth surface laminate with a glossy finish. Other techniques are used to produce laminates with surface finishes ranging from a satin or brushed textured look to a deeply embossed effect.

While these laminates have found commercial success, especially in the area of decorative applications, they suffer from one defect which has restricted their use in such areas as computer assembly work stations, floors, walls, ceilings; electronic furniture such as cabinetry; commercial floors of hotels etc; hospital and laboratory rooms wherein electrostatically sensitive films, solid state devices and hazardous vapors and the like are handled, i.e. areas where static build-up on surfaces causes problems. This defect is the laminates' inability to control electrostatic currents.

U.S. Pat. No. 4,301,040 provides a static-free laminate, wherein the back surface of a conventional decorative laminate is coated with a polymeric, film-forming, particulate binder material having uniformly dispersed therein a static-reducing amount of electrically conductive particle material such as carbon black.

Although the laminates of the above-mentioned patent partially solve the problem of static build-up, they require conductive particle bonding with adhesives which causes particle removal when contact with the surface occurs. Additionally, delamination of the conductive particle surface oftimes occurs when the laminate is contacted with materials such as water. Furthermore, working of the laminates such as by sawing, drilling etc. tends to further remove said particles of electrically conductive material. Another problem with the laminates of said reference is the difficulty with which uniform amounts of the particulate conductive material can be applied to the adhesive coated surface.

SUMMARY

An electrically conductive laminate which provides a non-instantaneous, controlled rate of static dissipation has now been provided whereby the deficiencies of those conductive laminates of the prior art have been overcome. The laminates of the present invention utilize a water-soluble, alkali metal salt in at least the overlay or decor layer of the laminate. The utilization of these alkali metals satls obviates the need for special adhesives as required when loose particles are employed such as in the above-specified patent and enables the use of conventional melamine resins as the impregnant and adhesive. The alkali metal salt becomes an integral part of the resultant laminate. The novel laminates of the present invention are more electrically conductive than commercially available laminates and do not exhibit color shifts or property changes vis-a-vis non-conducting laminates. Even though the alkali metal salt is positioned within the body of the laminate itself, the laminate still exhibits a surface resistivity which provides a safety feature while the conductive ground plane provides unexpected controlled electrical discharge through that surface. Additionally, since the conductive salt is not exposed to wear and accidental destruction during the use of the laminate because it is not solely on the laminate surface, there is no tendency for the salt to be rubbed off or otherwise removed from the laminate. While the products of the above-referenced patent afford substantially the same advantages as those of the present invention, the prior art products necessitate the use of one type of adhesive for the laminate components and another for the conductive particles. Also, only one type of adhesive may be used for bonding the laminate to a substrate. The present laminates however, enable the use of most available adhesives known for this purpose.

DESCRIPTION OF THE INVENTION INCLUDING PREFERRED EMBODIMENTS

As mentioned above, the novel laminates of the present invention are electrically conductive and contain, in at least the overlay or decor layer thereof, an electrically conductive, water-soluble alkali metal salt. The laminates of the present invention have an upper-most surface with a relatively high surface resistivity i.e. approx. $10^8$–$10^{12}$ ohms/square, and one or more plies of a conductive, non-film forming layer of approx. 1–100,000 ohms/cm resistance. When the laminates hereof are connected to a ground, the electrically conductive nature of the system is such that the electrical potential of the ground is approached in a non-instantaneous, controlled rate.

The above-mentioned properties are imparted to the novel laminates hereof by the incorporation into at least the overlay or decor layer of a conventional laminate, of at least one water-soluble, alkali metal salt. Any water-soluble alkali metal salt may be used for this purpose, the preferred salts being those which do not leach out of the laminates over a period of time and those more preferred being those which do not impart any color to the laminates. Examples of useful salts include the halides, sulfates, nitrates, nitrites, carbonates, bicarbonates, bisulfites, thiosulfates, perborates, formates, acetates, phenylates, oleates, stearates, oxalates and the like of such metals as sodium, potassium, lithium or rubidium. The preferred salts are the formates and the preferred formate is sodium formate.

The alkali metal salt should be incorporated into the laminate in amounts ranging from about 0.5 to about 10.0%, preferably from about 1.0 to about 5.0%, by weight, based on the total weight of paper in the laminate. It is necessary that the salt, alone or in admixture with another such salt, be incorporated into the laminate in the decor or overlay sheet of the laminate, however, it may also be incorporated into one or more of the core sheets in conjunction with either of the decor or overlay sheet.

The alkali metal salt may be incorporated into the paper sheet of the laminate during the manufacture of the paper i.e. in the papermaking machine by adding it to the papermaking fibers at the wire. It is preferred, however, that the salt be incorporated into the paper by adding it to the impregnating resin with which the sheet is impregnated. This may be accomplished by mixing the appropriate amount of salt with the resin in the resin bath of the treater during the conventional paper impregnating step conducted in the preparation of decorative laminate components.

In a second feature of the present invention, one or more of the kraft paper core sheets can be replaced by an electrically conductive fibrous web in order to impart a greater conductivity to the laminate. When such a web is employed in the core, it is preferred that the conductive salt web be positioned as closely as possible to the decor or overlay conductive web in the laminate. It is also permissible to incorporate the salt in the conductive core web and decor or overlay sheet, however, such a configuration is not preferred.

The conductive web is preferably a cellulose fiber-based paper with a high loading of electrically conductive material such as carbon, carbon black, silver, aluminum and metal salts, e.g. aluminum silicate, aluminasilicate, graphite and the like in any form. If the conductive material is used in the form of a particle, the particle size should be less than about 40 millimicrons and preferably from about 25 to about 35 millimicrons. Additionally, the conductive material may be used in the form of flakes, etc. or combinations thereof. The fibrous web may be produced by known procedures, the conductive material usually being added to the web at the time the web is produced. The electrically conductive material should be present in the web at from about 1-60 weight percent, preferably 5-40 weight percent.

The electrically conductive fibrous web can be placed anywhere in the core of the laminate and more than one web may be used in the core. It is possible that all of the conventional core sheets can be replaced by the electrically conductive webs. As discussed above, it is preferred that the conductive web be placed as near to the top of the core as possible since the salt is positioned in the decor or overlay sheet. Although particles of the electrically conductive material are preferred, as mentioned above, the material can be used in the form of e.g. fibers and formed into the fibrous webs alone or in combination with cellulose fiber.

As mentioned above, the present invention is directed to decorative laminates. When such decorative laminates are produced, an assembly, in superimposed relationship, of a. a plurality of thermosetting phenolic resin impregnated cellulosic core sheets;
b. a decorative sheet positioned immediately above said (a) and impregnated with a noble thermosetting resin, preferably a melamine/formaldehyde resin;
c. an optional protective overlay sheet also impregnated with a noble thermosetting resin, preferably a melamine/formaldehyde resin;
d. optionally, a release sheet and
e. a press plate or master, wherein at least one of b or c contains from about 0.5–10%, by weight, based on the weight of the paper in the assembly, of a water-soluble alkali metal salt, is formed and heat and pressure consolidated into a decorative laminate having on its surface the exact image of that of the press plate or master, if any. The laminate is recovered by separating it from the press plate at the locus of the release sheet.

The decorative sheet used in manufacturing the laminate is well known in the art and generally comprises a print sheet or solid color sheet having a basis weight of about 80–200 grams per square meter. The resin with which it is impregnated is generally a melamine-formaldehyde resin. From about 35 to about 55%, by weight, based on the total weight of the sheet, of the resin is impregnated into the sheet.

An overlay sheet may be placed atop the decorative sheet if desired, to provide a protective surface to the decorative laminate as is known in the art. In such an instance, an alpha-cellulose containing paper may be used having a basis weight of about 16–60 grams per square meter and impregnated with a melamine-formaldehyde resin to a content between about 50 and 75%, by weight, based on the total weight of the sheet.

The following examples are set forth for purposes of illustration only and are not to be construed as limitations on the present invention. All parts and percentages are by weight unless otherwise specified.

EXAMPLE 1

A laminate assembly is formed by placing, in superimposed relationship, the following:

1. a topmost iron plate,
2. 8 sheets of kraft paper cushion
3. 1 sheet of glassine separator
4. 1 sheet of thermosetting phenolic resin impregnated, 195 gram basis weight, cellulosic paper containing 40 weight percent of carbon particles and 34% of phenolic resin,
5. 5 sheets of kraft paper (185 gram basis weight) impregnated with thermosetting phenolic resin as, in (4), 6. 1 sheet of decorative print, α-cellulose containing paper impregnated with a thermosetting melamine/formaldehyde resin,
7. 1 sheet of a thermosetting melamine/formaldehyde resin impregnated -cellulose containing overlay paper, containing 5%, by weight, based on the weight of the paper in the assembly, of sodium formate,
8. 1 sheet of an aluminum foil release paper and
9. 1 press plate.

The resultant assembly is inserted into a laminating press and heat and pressure consolidated at over 6.89 MPa and a temperature of 140°–150° C. for 20 minutes. The assembly is then removed from the press and the laminate is recovered.

Using the mathematical representation of a voltage discharge through a resistance to ground (R) and capacitance (C) circuit of $$V = V_o \exp\left(-\frac{t}{RC}\right)$$

wherein $V_o$=initial voltage of the surface, C the capacitance of a human touching the surface, or of a tote box/electronic device touching the surface—usually defined as 200 picofarads, to the time in seconds after $V_o$ is applied, and V, the voltage at time t, a relationship of V, R, and t can be developed.

A reasonable "safe" voltage is frequently stated to be 10% of the applied voltage, i.e. $V=0.10\ V_o$. Using the equation above, the following table is generated.

| Resistance to ground ohms | Time to reach 10% Voltage level seconds |
|---|---|
| $10^6$ | $4.6 \times 10^{-4}$ |
| $10^7$ | $4.6 \times 10^{-3}$ |
| $10^8$ | $4.6 \times 10^{-2}$ |
| $10^9$ | $4.6 \times 10^{-1}$ |
| $10^{10}$ | 4.6 |
| $10^{11}$ | 46.0 |

According to Federal Test Standard 101C, Method 4046, a time decay of 2 seconds or less is considered acceptable. From the above table it is obvious that resistances to ground of $10^9$ or less is preferred. Resistance less than $10^6$ ohms are capable of producing voltage decays which are too rapid and the resultant ohmic heating of sensitive electronic solid state components can cause substantial damage. Moreover, human perception of such current flows is significant.

Following the test methods defined in ASTM/ANSI D257 and F150, and in NFPA 56A, surface resistivity and resistance through the laminate to ground are measured as $10^9$ ohms/square and $10^7$ ohms, respectively, at a 500 volt potential and at 50% RH, 68° F.

EXAMPLE 2

The procedure of Example 1 is again followed except that the conductive layer 4 is eliminated. The resultant laminate is recovered and tested for surface resistivity and resistance to ground as in Example 1. The values obtained are $10^9$ ohms/square and $10^{10}$ ohms, respectively.

EXAMPLE 3

(Comparative)

A non-conductive, conventional, high-pressure decorative laminate i.e. that of Example 1 with layer 4 eliminated, and no salt in the overlay paper, is bonded with a commercially available contact adhesive to a particleboard substrate, following an accepted fabrication technique, and conditioned in a 50% RH environment.

Measurement of surface resistivity and resistivity to ground shows values of $10^{13}$ ohms/square and $10^{10}$ ohms, respectively.

EXAMPLE 4

A laminate is prepared as in Example 1 with the electrically conductive salt incorporated into the decorative print paper. The laminate is bonded to a particleboard substrate and conditioned as in Example 3. Surface resistivity and resistance to ground are measured as $10^9$ ohms/square and $10^7$ ohms, raespectively. This represents a $10^4$ times inprovement over the laminate of Example 3, in the laminate's ability to dissipate a surface charge.

EXAMPLE 5

Laminates are prepared as in Example 1 wherein one or a plurality of conductive carbon fiber webs are positioned between, but not displacing, the kraft paper sheets of the laminate core. These carbon fiber veils (gossamer sheets) consist of 0.75 inch long carbon fibers, 0.75 inch polyester fibers and hardwood pulp with the loadings of carbon fiber ranging from about 1% to about 90%. The hardwood pulp component is held constant at 10% while the polyester fiber is varied in proportion to the carbon fiber. The web weight for the 90% carbon fiber loading is 6.78 grams per square meter while the 40% loading weighs 11.2 grams per square meter.

The carbon webs are inserted into the laminate in their manufactured form, i.e. not saturated with the conventional phenolic resin. Resin flow to and between the carbon web is obtained through the high pressure associated with the laminating process. This use of a dry conductive web constitutes a significant advantage of the process.

Laminates prepared with this configuration show surface resistivities and resistance to ground comparable to the laminate of Example 4.

EXAMPLE 6

Positioning of the gossamer veils of Example 5 directly beneath the decor sheet does not impart a color change to the laminate surface color.

EXAMPLE 7

Following the procedure of Example 1, a series of laminates is parpared utilizing different salts incorporated into various components of the laminate as shown in Table I. In each instance, a highly effective conductive laminate is produced.

TABLE I

| Example | Salt - % | Position in Laminate |
|---|---|---|
| 7 | Potassium Formiate - 8% | Decorative Print |
| 8 | Sodium Chloride - 4% | Overlay |
| 9 | Lithium Nitrate - 7% | Print & Overlay |
| 10 | Rubidium Sulfate - 3% | Overlay |
| 11 | Sodium Stearate - 5% | Overlay |

TABLE I-continued

| Example | Salt - % | Position in Laminate |
| --- | --- | --- |
| 12 | Potassium Nitrate - 4% | Decorative Print |
| 13 | Sodium Phenylate - 10% | Overlay |
| 14 | Potassium Chloride - 6% | Overlay |

We claim:

1. An electrically conductive laminate comprising, in superimposed relationship,
   (a) a plurality of thermoset resin impregnated cellulosic core sheets
   (b) a decorative print sheet impregnated with a noble thermoset resin, and
   (c) optionally, an overlay sheet impregnated with a noble thermoset resin, wherein at least the overlay or decor layer contains from about 0.5 to about 10%, by weight, based on the total non-resin weight of the laminate, of a water-soluble alkali metal salt and at least one component of the core comprises an electrically conductive fibrous web.

2. A laminate in accordance with claim 1 wherein said salt is sodium formate.

3. A laminate in accordance with claim 1 wherein said fibrous web is positioned as the topmost sheet of the laminate core and below said decor sheet.

4. A laminate in accordance with claim 1 wherein said fibrous web comprises a sheet of paper laden with carbon particles.

5. A laminate in accordance with claim 1 wherein said fibrous web comprises a sheet containing carbon fibers.

6. A laminate in accordance with claim 1 wherein a plurality of conductive webs are positioned in said core.

7. A laminate in accordance with claim 1 wherein said salt is contained in said overlay sheet.

8. A laminate in accordance with claim 1 wherein said salt is contained in said decorative print sheet.

9. A method for the preparation of the laminate of claim 1 which comprises heat and pressure consolidating a laminate assembly comprising, in superimposed relationship,
   (a) a plurality of thermosetting resin impregnated cellulosic core sheets at least one of which comprises an electrically conductive fibrous web,
   (b) a decorative print sheet impregnated with a noble thermosetting resin,
   (c) an optional overlay sheet impregnated with a noble thermosetting resin and
   (d) a press plate,
wherein at least one of said decorative print sheet or overlay sheet contains from about 0.5 to about 10.0%, by weight, based on the total weight of non-resin in said assembly, of a water-soluble alkali metal salt.

* * * * *